(12) United States Patent  
Dai et al.

(10) Patent No.: US 9,090,244 B2  
(45) Date of Patent: Jul. 28, 2015

(54) SYSTEMS AND METHODS FOR MAINTAINING A SUBSTANTIALLY STABLE ENGINE IDLE SPEED AFTER A GARAGE SHIFT

(71) Applicant: GM GLOBAL TECHNOLOGY OPERATIONS LLC, Detroit, MI (US)

(72) Inventors: Junhong Dai, Rochester Hills, MI (US); Wenbo Wang, Novi, MI (US); Krishnendu Kar, South Lyon, MI (US); Leon Cribbins, Dexter, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 335 days.

(21) Appl. No.: 13/789,883

(22) Filed: Mar. 8, 2013

(65) Prior Publication Data

US 2014/0257651 A1 Sep. 11, 2014

(51) Int. Cl.
*B60W 10/06* (2006.01)
*F02D 41/16* (2006.01)
(Continued)

(52) U.S. Cl.
CPC ............. *B60W 10/06* (2013.01); *B60W 10/023* (2013.01); *B60W 10/11* (2013.01); *B60W 10/115* (2013.01); *B60W 30/18054* (2013.01); *F02D 31/001* (2013.01); *F02D 31/008* (2013.01); *F02D 41/023* (2013.01); *F02D 41/16* (2013.01); *B60W 2510/0642* (2013.01); *B60W 2510/102* (2013.01); *B60W 2710/065* (2013.01); *B60W 2710/0666* (2013.01); *F02D 41/022* (2013.01); *F02D 2250/18* (2013.01); *F02D 2400/12* (2013.01)

(58) Field of Classification Search
CPC ..... F02D 41/16; F02D 41/023; F02D 31/001; F02D 31/008; F02D 2250/18; F02D 2400/12; F02D 41/022; B60W 10/06; B60W 10/11; B60W 10/023; B60W 10/115; B60W 30/18054; B60W 2710/0666; B60W 2510/0642; B60W 2510/102; B60W 2710/065
USPC ............. 701/51, 53, 54, 58, 60, 66; 192/3.51; 477/115, 116
See application file for complete search history.

(56) References Cited

U.S. PATENT DOCUMENTS 4,220,058 A * 9/1980 Petzold ........................ 475/125
5,072,390 A * 12/1991 Lentz et al. ..................... 701/60
(Continued)

OTHER PUBLICATIONS

Gao et al, J. Integrated Powertrain Control of Gearshift for Automatic Transmission, 2010 First International Conference on Pervasive Computing Signal Processing and Applications, 2010, pp. 239-242.*

*Primary Examiner* — Russell Frejd
(74) *Attorney, Agent, or Firm* — Quinn Law Group, PLLC

(57) ABSTRACT

A method of maintaining a substantially stable engine speed after a garage shift of an automatic transmission includes identifying a moment when a load from the automatic transmission is applied to an engine via a torque converter during the garage shift based on a first turbine speed change with respect to a reference engine speed change and a second turbine speed change with respect to an actual engine speed change. The method further includes generating a feed forward torque command based on a turbine speed decrement after identifying the moment when the load from the automatic transmission is applied to the engine, and controlling the engine based on the feed forward torque command to maintain a substantially stable engine speed after the garage shift.

20 Claims, 4 Drawing Sheets

(51) Int. Cl.
  *B60W 10/11* (2012.01)
  *B60W 10/02* (2006.01)
  *B60W 10/115* (2012.01)
  *B60W 30/18* (2012.01)
  *F02D 31/00* (2006.01)
  *F02D 41/02* (2006.01)

(56) References Cited

U.S. PATENT DOCUMENTS

| 5,855,533 A * | 1/1999 | Tolkacz et al. .............. 477/110 |
| 6,799,108 B2 | 9/2004 | Aldrich, III et al. |
| 2012/0035819 A1 | 2/2012 | Hebbale et al. |

* cited by examiner

SYSTEMS AND METHODS FOR MAINTAINING A SUBSTANTIALLY STABLE ENGINE IDLE SPEED AFTER A GARAGE SHIFT

TECHNICAL FIELD

The present disclosure relates to methods and systems of controlling a powertrain system to maintain a substantially stable engine idle speed after a garage shift of an automatic transmission.

BACKGROUND

A motor vehicle powertrain may include an automatic transmission, an internal combustion engine, and a hydraulic torque converter coupled between the internal combustion engine and the automatic transmission. The hydraulic torque converter includes a housing, a turbine, and an impeller or pump. The housing is bolted to the flywheel of the engine. The housing rotates at the same speed as the engine. The pump includes fins that are attached to the housing. The fluid is directed by the fins radially outwardly into fins on the turbine, which causes the turbine to spin. The turbine is connected to the transmission. As a result, the hydraulic torque converter transfers engine torque to the transmission.

SUMMARY

The present disclosures relates to methods of maintaining a substantially stable engine speed after a garage shift of an automatic transmission. In an embodiment, the method includes determining a first turbine speed change with respect to a reference engine speed change; determining a second turbine speed change with respect to an actual engine speed change; identifying a moment when a load from the automatic transmission is applied to an engine via a torque converter during the garage shift based on the first turbine speed and the second turbine speed change; generating a feed forward torque command based on a turbine speed decrement after identifying the moment when the load from the automatic transmission is applied to the engine; and controlling the engine based on the feed forward torque command to maintain a substantially stable engine speed after the garage shift.

In an embodiment of the disclosed method, the first turbine speed change may be determined by: determining an initial turbine speed at a beginning of the garage shaft; determining an initial reference engine speed at the beginning of the garage shift; monitoring a current turbine speed; and determining a current reference engine speed. In addition, the step of determining the first turbine speed change further includes calculating a difference between the initial turbine speed and the current turbine speed to determine the turbine speed decrement; calculating a difference between the initial reference engine speed and the current reference engine speed to determine the reference engine speed change; and calculating a difference between the turbine speed decrement and the reference engine speed change.

In an embodiment, the method may further include determining an actual initial engine speed at the beginning of the garage shift, and determining an actual current engine speed. The second turbine speed change may be determined by: calculating a difference between the actual initial engine speed and the actual current engine speed to determine an actual engine speed change; and calculating a difference between the turbine speed decrement and the actual engine speed change.

In an embodiment, the method may further include determining whether a gear selector that is operatively coupled to the automatic transmission has shifted from a non-drive transmission position to a drive transmission position. The initial turbine speed may be determined only if the gear selector shifted from the non-drive transmission position to the drive transmission position. The method may further include monitoring a transmission fluid temperature.

In an embodiment, the method may further include determining whether the first turbine speed change is greater than or equal to a first calibration value. The first calibration value is a function of the transmission fluid temperature.

In an embodiment, the method may further include determining whether the second turbine speed change is greater than or equal to a second calibration value. The second calibration value is a function of the transmission fluid temperature and a difference between the actual initial engine speed and the initial turbine speed.

In an embodiment of this method, the engine may be controlled based on the feed forward torque command if the first turbine speed change is greater than or equal to the first calibration value and the second turbine speed change is greater than or equal to the second calibration value. The engine may be controlled by increasing an engine feed forward torque proportionally to the turbine speed decrement.

The disclosed method may further include determining whether the current turbine speed is decreased to a third calibration value after increasing the engine feed forward torque. The third calibration value is a function of the transmission fluid temperature. The engine may be controlled based on the feed forward torque command by increasing the engine torque until the current turbine speed is equal to or less than the third calibration value. The engine may be controlled by decreasing the engine feed forward torque after a vehicle that includes the engine starts to move. The engine feed forward torque may be fully removed after the vehicle moves at a vehicle speed that is equal to or greater than a calibratable vehicle speed value.

The present disclosure also relates to powertrain systems. In an embodiment, the powertrain system includes an engine, an automatic transmission, and a torque converter including a turbine. The torque converter is coupled between the automatic transmission and the engine. The powertrain system further includes a system controller operatively coupled to the engine. The system controller is configured to identify a moment when a load from the automatic transmission is applied to an engine via a torque converter after a garage shift based on a first turbine speed change with respect to a reference engine speed change and a second turbine speed change with respect to an actual engine speed change; generate a feed forward torque command based on a turbine speed decrement after identifying the moment when the load from the automatic transmission is applied to the engine; and adjust an engine output torque of the engine in accordance with the feed forward torque command to maintain a substantially stable engine speed after a garage shift.

In an embodiment, the powertrain system further includes an engine actuator responsive to the feed forward torque command to adjust the engine output torque. The automatic transmission may be configured to shift between a non-drive transmission state and drive transmission state such that the garage shift occurs when the automatic transmission shifts from the non-drive transmission state to drive transmission state. The powertrain system may further include a gear selector operatively coupled to the automatic transmission. The gear selector is configured to receive input from an operator to shift the automatic transmission between the non-drive transmission state and drive transmission state. The powertrain system may further include a turbine speed sensor disposed in electronic communication with the system controller. The turbine speed sensor is configured to measure a turbine rotational speed of the turbine and send a turbine speed signal to the system controller.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
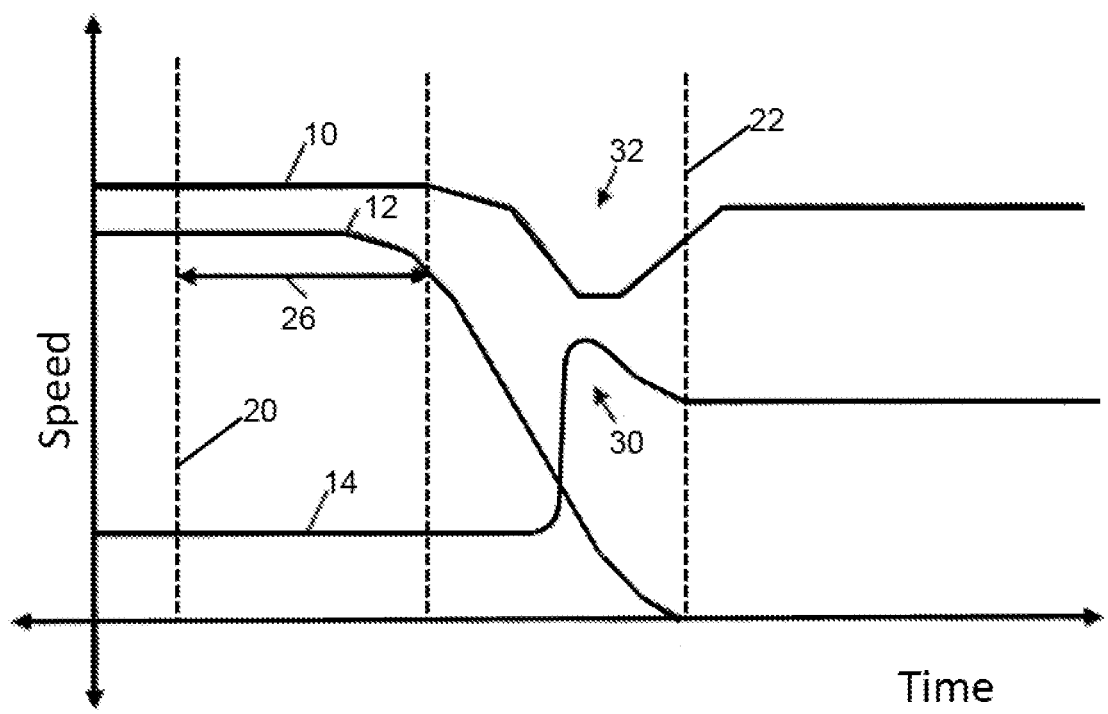
FIG. 1 is a graphical depiction illustrating a poorly compensated garage shift.

FIG. 1 illustrates a poorly compensated garage shift. Specifically, engine idle speed 10, turbine speed 12, and engine idle speed compensation 14 as well as their respective timings are shown. The start of the garage shift occurs at 20 and ends at 22. A time delay indicated by arrow 26 occurs while the transmission is applying the transmission input clutch. As can be appreciated, the load of the transmission on the engine increases quickly as seen at 30, causing the engine speed to sag as can be seen at 32.

An engine control module (ECM) controls the internal combustion engine and modifies engine idle speed. The ECM modifies engine idle speed using idle air control (IAC), electronic throttle control (ETC), or other similar functions. The ECM typically receives the following control inputs: acceleration pedal position, engine speed, turbine speed, transmission fluid temperature, transmission gear selector position, and vehicle speed.

Automatic transmissions typically include a gear selector for selecting non-drive transmission positions such as park or neutral and drive transmission positions such as reverse or forward. A garage shift occurs when the driver shifts the automatic transmission from a non-drive transmission position or state to a drive transmission position or state. When the garage shift occurs, the load on the engine may increase significantly when the transmission has the ability to transmit torque between the engine and the driven wheels. In a drive transmission position (e.g. reverse or forward), a torque load of the transmission and the driven vehicle wheels is applied to the engine via the torque converter. As a consequence, the torque load on the engine increases during the garage shift. The torque increase does not occur instantaneously. Rather, there is a time delay while the transmission engages a transmission input clutch. The time delay is a function of the transmission type, pump pressure, oil temperature and other factors. Additionally, the initial load presented by the transmission may be greater than the steady-state load. In other words, more effort is required to initially shear and spin the transmission fluid in the transmission than to keep the transmission spinning. During the garage shift, the magnitude of the transmission load and its timing may vary greatly. As a result of this variation, maintaining substantially stable engine idle speed during the garage shift can be challenging.

Conventional methods of compensating engine idle speed during the garage shift may include closed-loop feedback systems that detect engine speed sag and subsequently increase engine output torque to recover the engine speed. Other methods inhibit closed-loop idle control until the transmission load is present or use a calibrated timing to anticipate the increased load requirement. Closed-loop systems require an engine speed sag to occur. Calibrated timing is susceptible to transmission clutch engagement variations and may still cause engine speed sag or flares. It is therefore desirable to develop a feed forward control system and method of compensating engine idle speed after a garage shift before an engine speed sag occurs.

Figure 2:
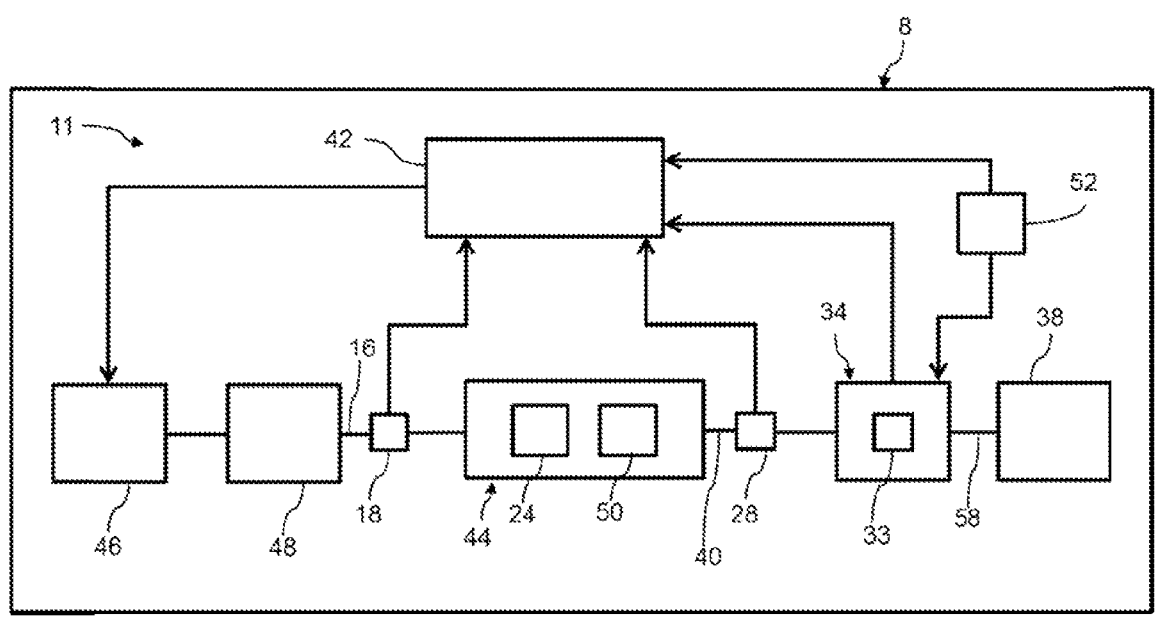
FIG. 2 is a schematic block diagram of a vehicle including a powertrain system.

FIG. 2 schematically shows a vehicle 8 including a powertrain system 11 configured to propel the vehicle 8. The powertrain system 11 includes an engine 48 and one or more engine actuators 46 configured to interact with the engine 48 to control the operation of the engine 48. For example, the engine actuators 46 may include, but are not limited to, throttles, spark plugs, fuel injection systems, and other components and systems that can be regulated to control the operation of the engine 48.

The powertrain system 11 further includes an automatic transmission 34 mechanically coupled to the engine 48. As such, the engine 48 is configured to supply power to the automatic transmission 34. The automatic transmission 34 has one or more non-drive transmission states, such as park or neutral, and one or more drive transmission states, such as reverse or drive. The vehicle 8 further includes a transmission gear selector 52 disposed in electro-mechanical communication with the automatic transmission 34. The transmission gear selector 52 can receive an input or request from a vehicle operator. For instance, the vehicle operator may actuate the transmission gear selector 52 by moving it from one of the non-drive transmission positions, such as park or neutral, to one of the drive transmission positions, such as reverse or drive. Once it changes position, the transmission gear selector 52 can generate a gear selector position signal indicative of the gear selector position and send the gear selector position signal to the automatic transmission 34. In response to the gear selector signal, the automatic transmission 34 shifts the necessary gears between one of the non-drive transmission positions and one of the drive transmission positions. The system controller 42 can be disposed in electronic communication with the transmission gear selector 52. As such, the system controller 42 can sense a vehicle operator request for transition from a non-drive transmission position to a drive transmission position.

The powertrain system 11 further includes a hydraulic torque converter 44 mechanically coupled between the engine 48 and automatic transmission 34. The engine 48 includes an engine output shaft 16 mechanically coupled to the torque converter 44. During operation of the engine 48, the engine output shaft 16 can rotate at a variable or constant engine rotational speed. In the present disclosure, the engine rotational speed may also be referred to as the engine speed. The powertrain system 11 includes an engine speed sensor 18 configured to measure the engine rotational speed of the engine output shaft 16 and generate an engine speed signal indicative of the engine rotational speed.

The torque converter 44 includes an impeller or pump 24, which is mechanically coupled to the engine output shaft 16 of the engine 48, and a turbine 50 mechanically coupled to the automatic transmission 34. The torque converter 44 includes a converter output shaft 40 mechanically coupled to the turbine 50. The converter output shaft 40 is in turn mechanically coupled to the automatic transmission 34. During operation of the powertrain system 11, the converter output shaft 40 rotates at a constant or variable turbine rotational speed. In the present disclosure, the turbine rotational speed may also be referred to as the turbine speed. The powertrain system 11 further includes a turbine speed sensor 28 configured to measure the turbine rotational speed and generate a turbine speed signal indicative of the turbine rotational speed. The turbine rotational speed may be equal or substantially similar to the transmission input speed.

The automatic transmission 34 contains transmission fluid, such as a transmission oil, and includes a transmission fluid temperature sensor 33 configured to measure the temperature of the transmission fluid. The transmission fluid temperature sensor 33 can generate a transmission fluid temperature signal indicative of the transmission fluid temperature. Moreover, the automatic transmission 34 includes a transmission output shaft 58. The powertrain system 11 further includes a driveline 38 mechanically coupled to the transmission output shaft 58. The driveline 38 distributes the engine power to the vehicle wheels (not shown) to propel the vehicle 8.

The powertrain system 11 further includes a system controller 42 configured to control the operation of one or more components of the powertrain system 11 such as the engine 48. The system controller 42 may include a Powertrain Control Module (PCM) and may perform the function of an engine controller and a transmission controller; however, these two controlling functions may be performed by a single device or a plurality of communicatively connected devices. Control module, module, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. Controller 42 has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators such as the engine actuators 46. Loop cycles may be executed at regular intervals, for example each 3.125, 6.25, 12.5, 25 and 100 milliseconds during ongoing engine and vehicle operation. Alternatively, algorithms may be executed in response to the occurrence of an event.

In the depicted embodiment, the system controller 42 generates an output signal and sends a feed forward torque command to the engine actuators 46. In response, the engine actuators 46 regulate the engine 48 to adjust the engine output torque, thereby controlling the engine rotational speed. Therefore, the engine 48 can be controlled based on the feed forward torque command received from the system controller 42.

The timing and magnitude of the feed forward toque command can be based on the transmission fluid temperature measured by the transmission fluid temperature sensor 33, the engine rotational speed measured by the engine speed sensor 18, the turbine speed measured by the turbine speed sensor 28, and the gear selector position signal generated by the gear selector 52. Accordingly, the system controller 42 is configured to receive input signals from the transmission fluid temperature sensor 33, the turbine speed sensor 28, the engine speed sensor 18, and the gear selector 52. In order to receive these input signals, the system controller 42 is disposed in electronic communication with the transmission fluid temperature sensor 33, the turbine speed sensor 28, the engine speed sensor 18, and the gear selector 52 via any suitable bus or network such as a local area network (LAN). The LAN therefore allows electronic communication between the system controller 42 and other components of the powertrain system 11. For example, the transmission fluid temperature sensor 33 can send the transmission fluid temperature signal to the system controller 42, the engine speed sensor 18 can send the engine speed signal to the system controller 42, and the turbine speed sensor 28 can send the turbine speed signal to the system controller 42. The system controller 42 may include a non-transitory computer readable medium and program instructions stored on the non-transitory computer readable medium that when executed cause one or more processors to perform any of the methods described in the present disclosure.

Figure 3:
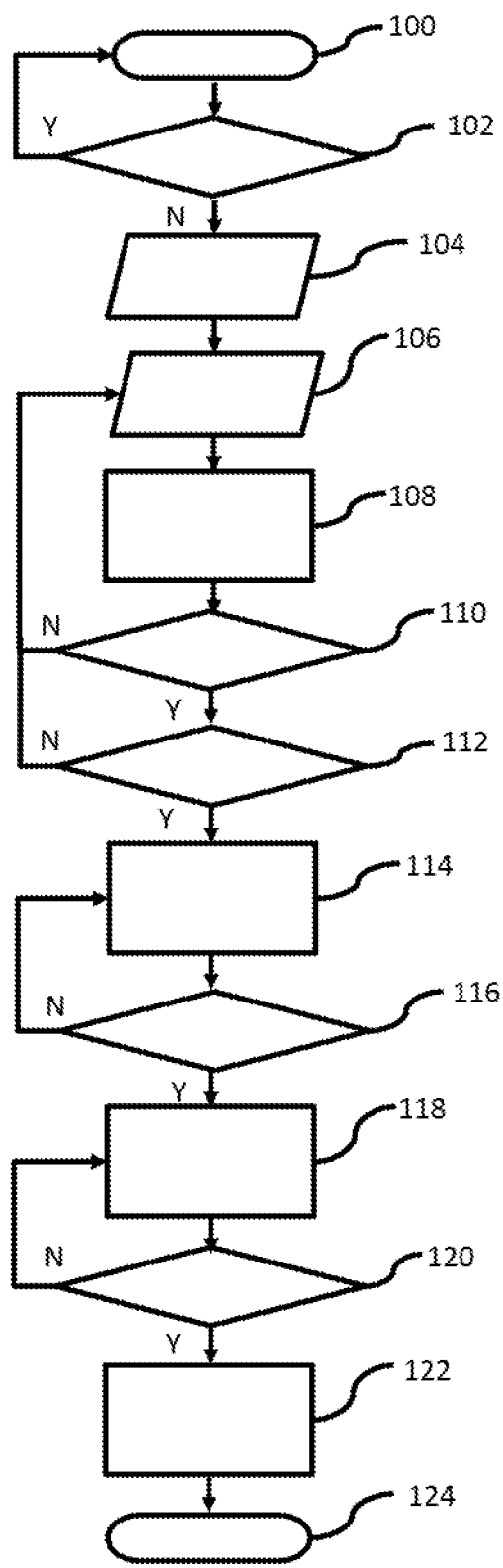
FIG. 3 is a flowchart describing a method of controlling the powertrain system of FIG. 2.
Figure 4:
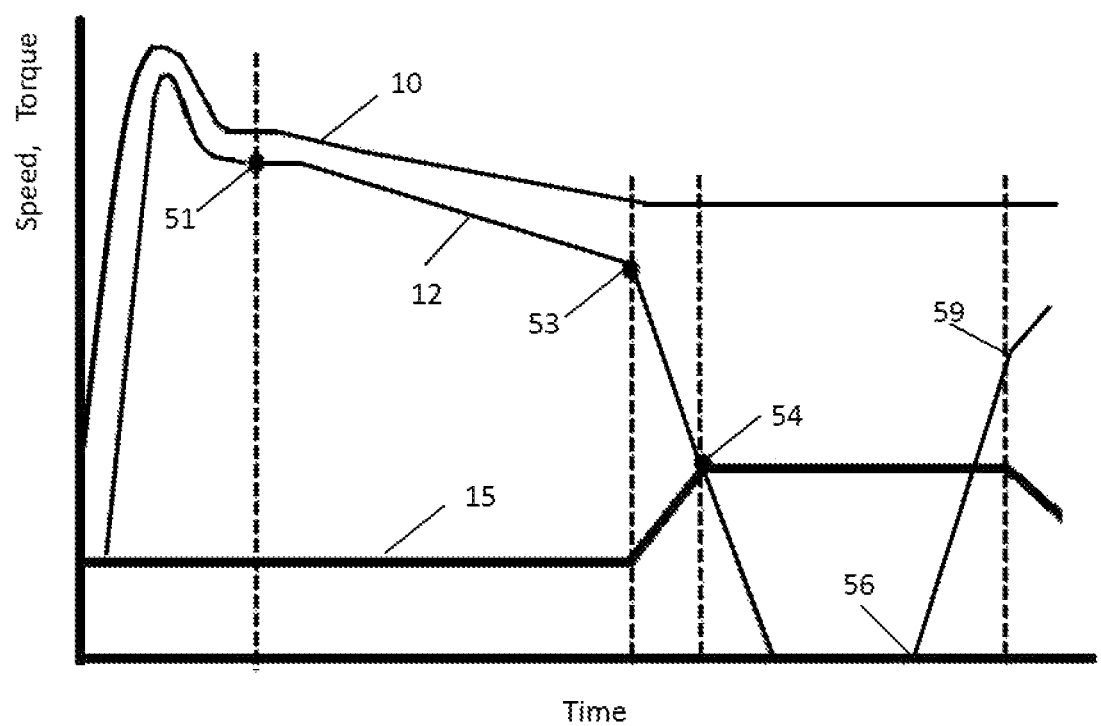
FIG. 4 is a graphical depiction illustrating a compensated garage shift when the powertrain system of FIG. 2 is controlled according to the method illustrated in FIG. 3.

FIG. 3 illustrates a method of controlling the powertrain system 11, while FIG. 4 is a graphical depiction of the operation of the powertrain system 11 when the system controller 42 (FIG. 2) executes the method illustrated in FIG. 3. The method illustrated in FIG. 3 includes a set of program instructions or steps stored on one or more computer readable mediums. The system controller 42 includes the computer readable medium storing these program instructions. The system controller 42 also includes one or more processors configured to execute the program instructions stored on the computer readable medium. In particular, this method can accurately determine, in real time, the moment when the transmission load is applied to the engine 48 after a garage shift. As discussed above, during the garage shift, the magnitude of the transmission load and its timing vary greatly. As a result of this variation, maintaining a substantially stable engine idle speed during the garage shift can be challenging. The method illustrated in FIG. 3, however, accurately determines the moment when the transmission load is applied to the engine 48 via the torque converter 44 immediately after a garage shift and regulates the engine 48 accordingly to maintain the engine rotational speed substantially stable. Specifically, the illustrated method identifies when the transmission can transmit torque to the engine after the gear selector position changes from park or neutral to drive or reverse. In other words, the method identifies a transmission load event during a garage shift. The transmission load event occurs when the difference between turbine rotational speed and the engine rotational speed increases beyond a predetermined threshold. This timing of the transmission load event is important because it represents the precise time when the engine load increase begins. If the engine output torque is increased prior to this time, an engine speed flare may result. Conversely, if the engine output torque is not increased properly after this time, an engine speed sag may occur. By precisely detecting the transmission load event, an increase in the output torque of the engine can be applied so that neither an engine speed flare nor an engine speed sag occurs. In other words, by generating an opposing engine output torque in response to the turbine speed decrease, the increase in transmission torque load may be compensated before it is transmitted across the torque converter and to the engine to reduce the engine speed.

With reference to FIGS. 3 and 4, the method of controlling the powertrain system 11 illustrated in FIG. 3 begins with step 100. Then in step 102, the system controller 42 determines whether the gear selector 52 is in park or neutral. In other words, the system controller 42 determines whether the gear selector 52 (FIG. 2) is in a non-drive transmission position, such as park or neutral, or a drive transmission position such as drive or reverse. If the gear selector 52 is in one of the non-drive transmission positions (e.g., park or neutral), the method returns to the beginning at step 100. The vehicle operator may move the gear selector 52 (FIG. 2) from a non-drive transmission position to a drive transmission position (i.e. garage shift event). The garage shift point 51 in FIG. 4 represents the occurrence of a garage shift event. If the gear selector 52 (FIG. 2) shifts from park or neutral (i.e. a non-drive transmission position) to drive or reverse (i.e., a drive transmission position), the system controller 42 receives and records an initial turbine rotational speed Nt0 and an initial engine rotational speed N0 in step 104. The initial turbine rotational speed Nt0 and the initial engine rotational speed N0 are measured at the beginning of the garage shift (i.e., at garage shift point 51) by the turbine speed sensor 28 and the engine speed sensor 18, respectively (FIG. 2). In other words, the system controller 42 stores the initial turbine rotational speed Nt0 and the initial engine rotational speed N0 on a suitable memory. Additionally in step 104, the system controller 42 reads and records an initial predetermined reference engine speed Nr0. The initial reference engine speed Nr0 may be obtained from a look up table and may be empirically derived from conventional dynamometer testing of the engine 48. It is contemplated that the initial reference engine speed Nr0 may be a target engine speed at the beginning of the garage shift.

In step 106, the system controller 42 reads and records the current turbine rotational speed Nt, the current engine rotational speed N, the current reference engine rotational speed Nr, and the transmission fluid temperature T. In other words, the system controller 42 monitors the current turbine rotational speed Nt, the current engine rotational speed N, the current reference engine rotational speed Nr, and the transmission fluid temperature T. In FIG. 4, the engine speed line 10 represents the current engine rotational speed N, and turbine speed line 12 represents the transmission input speed or the current turbine speed Nt. The current turbine rotational speed Nt is measured by the turbine speed sensor 28. The current engine rotational speed N is measured by the engine speed sensor 18. The transmission fluid temperature is measured by the transmission fluid temperature sensor 33. The current reference engine speed Nr may be obtained from a look up table and may be empirically derived from conventional dynamometer testing of the engine 48. The same look up table may include the current reference engine speed Nr and the initial reference engine speed Nr0. The current reference engine speed Nr and the initial reference engine speed Nr0 may be provided in a pre-stored table format indexed by time during the garage shift.

In step 108, the system controller 42 processes the input signals received from the turbine speed sensor 28, the engine speed sensor 18, and the look up table including the initial reference engine speed Nr0 and the current reference engine speed Nr to make the following calculations:

$$\Delta n1 = (Nt0 - Nt) - (Nr0 - Nr); \text{ and}$$

$$\Delta n2 = (Nt0 - Nt) - (N0 - N)$$

where Nt0 is the initial turbine rotational speed;
N0 is the initial actual engine rotational speed;
Nr0 is the initial reference engine speed;
Nr is the current reference engine speed;
Nt is the current turbine rotational speed; and
N is the current engine rotational speed.

In other words, in step 108, the system controller 42 determines a turbine speed change with respect to a reference engine speed change, $\Delta n1$, and a turbine speed change with respect to an actual engine speed change, $\Delta n2$. To determine the turbine speed change with respect to the reference engine speed change $\Delta n1$, the system controller 42 may first determine the turbine speed change. In doing so, the system controller 42 calculates the difference between the initial turbine speed Nt0 at the beginning of the garage shift (i.e., at garage shift point 51) and the current turbine speed Nt in order to determine the turbine speed change (Nt0−Nt). The turbine speed change may also be referred to as the turbine speed decrement. Then, the system controller 42 calculates the difference between the initial reference engine speed Nr0 at the beginning of the garage shift (i.e., at garage shift point 51) and the current reference engine speed Nr to determine reference engine speed change (Nr0−Nr). Next, the system controller 42 determines the turbine speed change with respect to the reference engine speed change $\Delta n1$ by calculating the difference between the turbine engine speed change (Nt0−Nt) and the reference engine speed change (Nr0−Nr). In the present disclosure, the turbine speed change with respect to the reference engine speed change $\Delta n1$ may also be referred to as the first turbine speed change with respect to the reference engine speed change or simply the first turbine speed change.

To determine the turbine speed change with respect to the actual engine speed change $\Delta n2$, the system controller 42 may first determine the turbine speed change, which is also referred to as the turbine speed decrement. In doing so, the system controller 42 calculates the difference between the initial turbine speed Nt0 at the beginning of the garage shift (i.e., at garage shift point 51) and the current turbine speed Nt in order to determine the turbine speed change (Nt0−Nt). Then, the system controller 42 calculates the difference between the actual initial engine speed N0 at the beginning of the garage shift (i.e., at garage shift line 51) and the actual current engine speed N to determine actual engine speed change (N0−N). Next, the system controller 42 determines the turbine speed change with respect to the actual engine speed change $\Delta n2$ by calculating the difference between the turbine engine speed change (Nt0−Nt) and the actual engine speed change (N0−N). The turbine speed change with respect to the actual engine speed change $\Delta n2$ may be referred to as the second turbine speed change with respect to the actual engine speed change or simply the second turbine speed change.

In step 110, the system controller 42 determines whether the turbine speed change with respect to the reference engine speed change $\Delta n1$ is greater than or equal to a first calibration value K1(T). The first calibration value K1(T) can be stored on a look up table and is a function of or dependent on the transmission fluid temperature T. The first calibration value K1(T) may be determined by testing the vehicle 8 under different transmission fluid temperatures. If the turbine speed change with respect to the reference engine speed change $\Delta n1$ is not greater than or equal to a first calibration value K1(T), the method returns to step 106 and the system controller 42 continues to read and record the current turbine rotational speed Nt, the current engine rotational speed N, the current reference engine rotational speed Nrt, and the transmission fluid temperature T in step 106. However, if the turbine speed change with respect to the reference engine speed change $\Delta n1$ is greater than or equal to a first calibration value K1(T), the system controller 42 determines whether the turbine speed change with respect to the actual engine speed change $\Delta n2$ is greater than or equal to a second calibration value K2(T, N0−Nt0) in step 112.

In step 112, as described above, the system controller 42 determines whether the turbine speed change with respect to the actual engine speed change $\Delta n2$ is greater than or equal to the second calibration value K2(T, N0−Nt0). The second calibration value K2(T, N0−Nt0) can be stored on a look up table and is a function of or dependent on the transmission fluid temperature T and the difference between the initial engine rotational speed N0 and the initial turbine rotational speed Nt0. The second calibration value K2(T, N0−Nt0) may be provided for reference in a pre-stored table format indexed by transmission fluid temperature T and the difference between the initial engine rotational speed N0 and the initial turbine rotational speed Nt0. Moreover, the second calibration value K2(T, N0−Nt0) can be determined by testing the vehicle 8 under different transmission fluid temperatures.

If the turbine speed change with respect to the actual engine speed change $\Delta n2$ is not greater than or equal to the second calibration value K2(T, N0−Nt0), then the system controller 42 continues to read and record the current turbine rotational speed Nt, the current engine rotational speed N, the current reference engine rotational speed Nr, and the transmission fluid temperature T in step 106. On the other hand, if the turbine speed change with respect to the actual engine speed change $\Delta n2$ is greater than or equal to the second calibration value K2(T, N0−Nt0), the transmission load event is occurring, and the system controller 42 generates a first feed forward torque command indicative of an application and increase of a feed forward torque to the engine 48. Specifically, the system controller 42 generates and sends the first feed forward torque command to the engine actuators 46. In response, the engine actuators 46 actuate to adjust the engine output torque of the engine 48 in accordance with the feed forward command. For example, the required increase in engine output torque may be generated by first increasing the intake air flow rate and then varying the spark timing The first feed forward torque command represents the feed forward torque required to compensate for the transmission load applied to the engine 48 and thereby maintain the engine rotational speed N substantially stable during the garage shift. Typically, the colder the transmission fluid, the larger the variation of the timing of the transmission load event as well as the magnitude of the feed forward torque.

In step 114, the feed forward torque applied to the engine 48 in an increasing manner. In other words, the system controller 42 controls the engine 48 via the engine actuators 46 to increase the engine torque proportionally to the turbine speed decrement (i.e., turbine speed change) in order to maintain the engine idle speed substantially stable during the garage shift. The increase in feed forward torque is proportional to the turbine speed decrement. The transmission load event is represented by the transmission load event point 53 in FIG. 4. The increase feed forward torque is proportional to the turbine speed decrement between the transmission load event at load event point 53 and point 54. In summary, the system controller 42 controls the engine 48 to maintain a substantially stable engine idle speed during the garage shift by varying the engine output torque based upon the feed forward command. Line 15 in FIG. 4 represents the feed forward torque command (also known as transmission load compensation).

The increasing feed forward torque is applied to the engine 48 (FIG. 2) until the current turbine rotational speed is equal to or less than a third calibration value K3(T). Accordingly, in step 116, the system controller 42 determines whether the current turbine rotational speed is equal to or less than the third calibration value K3(T). The third calibration value K3(T) can be stored on a look up table and is a function of or dependent on the fluid transmission temperature T. Specifically, the third calibration value K3(T) may be provided in a pre-stored table format indexed by transmission fluid temperature T and can be determined by testing the vehicle 8 under different transmission fluid temperatures.

Once the turbine rotational speed Nt is equal to or less than the third calibration value K3(T), the feed forward torque reaches its maximum predetermined value as is represented in FIG. 4 by fully applied torque point 54. In other words, the system controller 42 controls the engine 48 via the engine actuators 46 to generate the desired feed forward torque. Subsequent to this moment in time, the feed forward torque follows a calibrated value in step 118. This calibrated value is a function of or dependent on the engine speed, transmission fluid temperature, and transmission gear position.

While the feed forward torque is fully applied to the engine 48, the turbine rotational speed Nt decreases as shown in FIG. 4. Moreover, the turbine eventually stops spinning. Afterwards, the vehicle operator may either release the brake pedal to move the vehicle forward or backward, or shift the transmission gear from a drive state to a non-drive state. In both operations, the turbine speed will start spinning again driven by the pump of the torque converter. In the first operation, when vehicle operator releases the brake pedal of the vehicle 8 (FIG. 2), the turbine rotational speed Nt starts to increase at point 56 in FIG. 4 as the vehicle 8 moves forward or backward. As the turbine rotational speed Nt increases, eventually the engine feed forward torque may not be needed to compensate for the transmission load applied to the engine 48. In the second operation, the vehicle operator shifts the transmission gear from a drive state to a non-drive state, the turbine rotational speed Nt starts to increase at point 56 in FIG. 4, the engine feed forward torque is removed; otherwise, engine speed flare may occur.

After the vehicle is moving forward or backwards due to the brake pedal release, the system controller 42 determines whether to gradually remove the feed forward torque applied to the engine 48 in step 120. Specifically, if the vehicle speed has not reach a calibratable vehicle speed value, the feed forward torque continues to follow the calibrated value in step 118. On the other hand, if the vehicle speed is equal to or greater than the calibratable vehicle speed value, then the feed forward torque is gradually removed as the vehicle speed increases in step 122. Eventually, the feed forward torque is completely removed when the vehicle speed reaches another calibratable vehicle speed value. In FIG. 4, the feed forward torque starts to decrease at feed forward torque decrease point 59. After the feed forward torque has been completely removed, the method ends at step 124. At this point, the engine 48 is not controlled by the feed forward torque command.

By using the method described above, fewer calibration efforts are needed in comparison to conventional methods of compensating for a transmission load. In addition, the method described above can detect the transmission load event in real time, thereby preventing the occurrence of engine speed sags and flares after a garage shift.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of maintaining a substantially stable engine speed after a garage shift of an automatic transmission, comprising:
   determining a first turbine speed change with respect to a reference engine speed change;
   determining a second turbine speed change with respect to an actual engine speed change;
   identifying a moment when a load from the automatic transmission is applied to an engine via a torque converter during the garage shift based on the first turbine speed change and the second turbine speed change;
   generating a feed forward torque command based on a turbine speed decrement after identifying the moment when the load from the automatic transmission is applied to the engine; and
   controlling the engine based on the feed forward torque command to maintain a substantially stable engine speed after the garage shift.

2. The method of claim 1, further comprising:
   determining an initial turbine speed at a beginning of the garage shaft;
   determining an initial reference engine speed at the beginning of the garage shift;
   monitoring a current turbine speed; and
   determining a current reference engine speed.

3. The method of claim 1, wherein determining the first turbine speed change includes:
   calculating a difference between the initial turbine speed and the current turbine speed to determine the turbine speed decrement;
   calculating a difference between the initial reference engine speed and the current reference engine speed to determine the reference engine speed change; and
   calculating a difference between the turbine speed decrement and the reference engine speed change.

4. The method of claim 3, further comprising:
   determining an actual initial engine speed at the beginning of the garage shift; and
   determining an actual current engine speed.

5. The method of claim 4, wherein determining the second turbine speed change includes:
   calculating a difference between the actual initial engine speed and the actual current engine speed to determine the actual engine speed change; and
   calculating a difference between the turbine speed decrement and the actual engine speed change.

6. The method of claim 5, further comprising determining whether a gear selector that is operatively coupled to the automatic transmission has shifted from a non-drive transmission position to a drive transmission position.

7. The method of claim 6, wherein determining the initial turbine speed is performed only if the gear selector shifted from the non-drive transmission position to the drive transmission position.

8. The method of claim 1, further comprising monitoring a transmission fluid temperature.

9. The method of claim 8, further comprising determining whether the first turbine speed change is greater than or equal to a first calibration value, wherein the first calibration value is a function of the transmission fluid temperature.

10. The method of claim 9, further comprising determining whether the second turbine speed change is greater than or equal to a second calibration value, wherein the second calibration value is a function of the transmission fluid temperature and a difference between the actual initial engine speed and the initial turbine speed.

11. The method of claim 10, wherein controlling the engine based on the feed forward torque command is performed if the first turbine speed change is greater than or equal to the first calibration value and the second turbine speed change is greater than or equal to the second calibration value.

12. The method of claim 11, wherein controlling the engine includes increasing an engine feed forward torque proportionally to the turbine speed decrement.

13. The method of claim 12, further comprising determining whether the current turbine speed is equal to or less than a third calibration value after increasing the engine feed forward torque, wherein the third calibration value is a function of the transmission fluid temperature.

14. The method of claim 13, wherein controlling the engine based on the feed forward torque command further includes increasing the engine torque until the current turbine speed is equal to or less than the third calibration value.

15. The method of claim 14, wherein controlling the engine based on the feed forward torque command further includes decreasing the engine torque after a vehicle that includes the engine starts to move.

16. The method of claim 15, wherein the engine is no longer controlled based on the feed forward torque command after the vehicle moves at a vehicle speed that is equal to or greater than a calibratable vehicle speed value.

17. A powertrain system, comprising:
   an engine;
   an automatic transmission;
   a torque converter including a turbine, the torque converter being coupled between the automatic transmission and the engine; and
   a system controller operatively coupled to the engine; the system controller being configured to:
      identify a moment when a load from the automatic transmission is applied to an engine via a torque converter after a garage shift based on a first turbine speed change with respect to a reference engine speed change and a second turbine speed change with respect to an actual engine speed change and;
      generate a feed forward torque command based on a turbine speed decrement after identifying the moment when the load from the automatic transmission is applied to the engine; and
      adjust an engine output torque of the engine in accordance with the feed forward torque command to maintain a substantially stable engine speed after a garage shift.

18. The powertrain system of claim 17, further comprising an engine actuator responsive to the feed forward torque command to adjust the engine output torque.

19. The powertrain system of claim 17, wherein the automatic transmission is configured to shift between a non-drive transmission state and drive transmission state such that the garage shift occurs when the automatic transmission shifts from the non-drive transmission state to the drive transmission state.

20. The powertrain system of claim 19, further comprising a gear selector operatively coupled to the automatic transmission, wherein the gear selector is configured to receive input from an operator to shift the automatic transmission between the non-drive transmission state and drive transmission state.

* * * * *